US012579998B2

(12) United States Patent
Zhou et al.

(10) Patent No.: US 12,579,998 B2
(45) Date of Patent: Mar. 17, 2026

(54) METHOD FOR STORING AND ACQUIRING INFORMATION USING FLUORESCENCE DEFECTS IN WIDE BANDGAP MATERIALS

(71) Applicant: UNIVERSITY OF SCIENCE AND TECHNOLOGY OF CHINA, Hefei (CN)

(72) Inventors: Jingyang Zhou, Hefei (CN); Kangwei Xia, Hefei (CN); Ya Wang, Hefei (CN); Jiangfeng Du, Hefei (CN)

(73) Assignee: University of Science and Technology of China, Hefei (CN)

( * ) Notice: Subject to any disclaimer, the term of this patent is extended or adjusted under 35 U.S.C. 154(b) by 0 days.

(21) Appl. No.: 18/865,779

(22) PCT Filed: Sep. 25, 2023

(86) PCT No.: PCT/CN2023/121071
§ 371 (c)(1),
(2) Date: Nov. 14, 2024

(87) PCT Pub. No.: WO2025/065142
PCT Pub. Date: Apr. 3, 2025

(65) Prior Publication Data
US 2026/0018188 A1     Jan. 15, 2026

(51) Int. Cl.
*G11B 7/26* (2006.01)

(52) U.S. Cl.
CPC .................................... *G11B 7/268* (2013.01)

(58) Field of Classification Search
None
See application file for complete search history.

(56) References Cited

U.S. PATENT DOCUMENTS

| 5,557,596 A | 9/1996 | Gibson et al. |
| 2014/0017447 A1* | 1/2014 | Kondo .................... C30B 29/20 |
| | | 428/141 |
| 2018/0252781 A1* | 9/2018 | Meriles ................. G11B 20/18 |
| 2023/0146938 A1* | 5/2023 | Atanackovic ....... H01L 21/2252 |
| | | 257/183 |
| 2024/0112733 A1 | 4/2024 | Guo et al. |
| 2024/0142814 A1* | 5/2024 | Chatterjee ........... G02F 1/13439 |
| 2025/0212474 A1* | 6/2025 | Atanackovic ..... H01L 21/02579 |

FOREIGN PATENT DOCUMENTS

| CN | 109933302 A | 6/2019 |
| CN | 115966233 A | 4/2023 |

* cited by examiner

*Primary Examiner* — Peter Vincent Agustin
(74) *Attorney, Agent, or Firm* — Christensen, Fonder, Dardi & Herbert PLLC; John P. Fonder

(57) ABSTRACT

A method for storing and acquiring information using fluorescence defects in wide bandgap materials, a device, an apparatus and a storage medium are provided, which are applied to a field of optical information storage technology. The method includes: determining a processing parameter group, where the processing parameter group is configured to store target information into wide bandgap materials, and the processing parameter group comprises at least one processing parameter; performing a processing at M storage addresses of the wide bandgap materials based on the processing parameter group, so that fluorescence defects matching the target information are generated at the M storage addresses, where M is a positive integer.

11 Claims, 2 Drawing Sheets

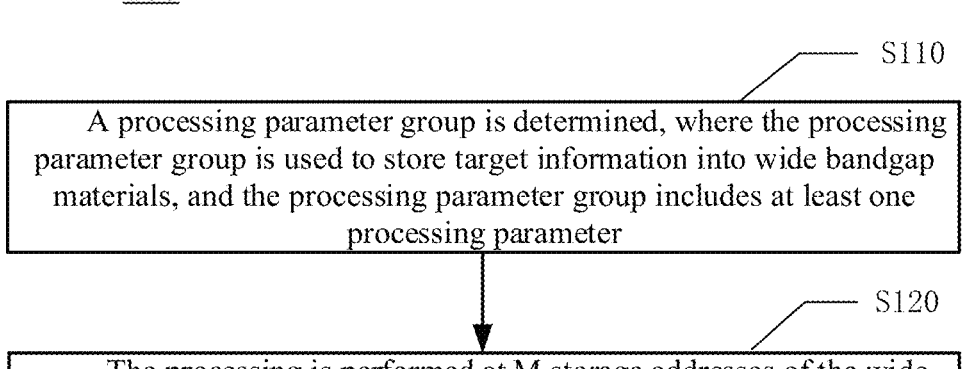

100

S110

A processing parameter group is determined, where the processing parameter group is used to store target information into wide bandgap materials, and the processing parameter group includes at least one processing parameter

S120

The processing is performed at M storage addresses of the wide bandgap material based on the processing parameter group, so that fluorescence defects matching the target information are generated at the M storage addresses, where M is a positive integer

FIG. 1

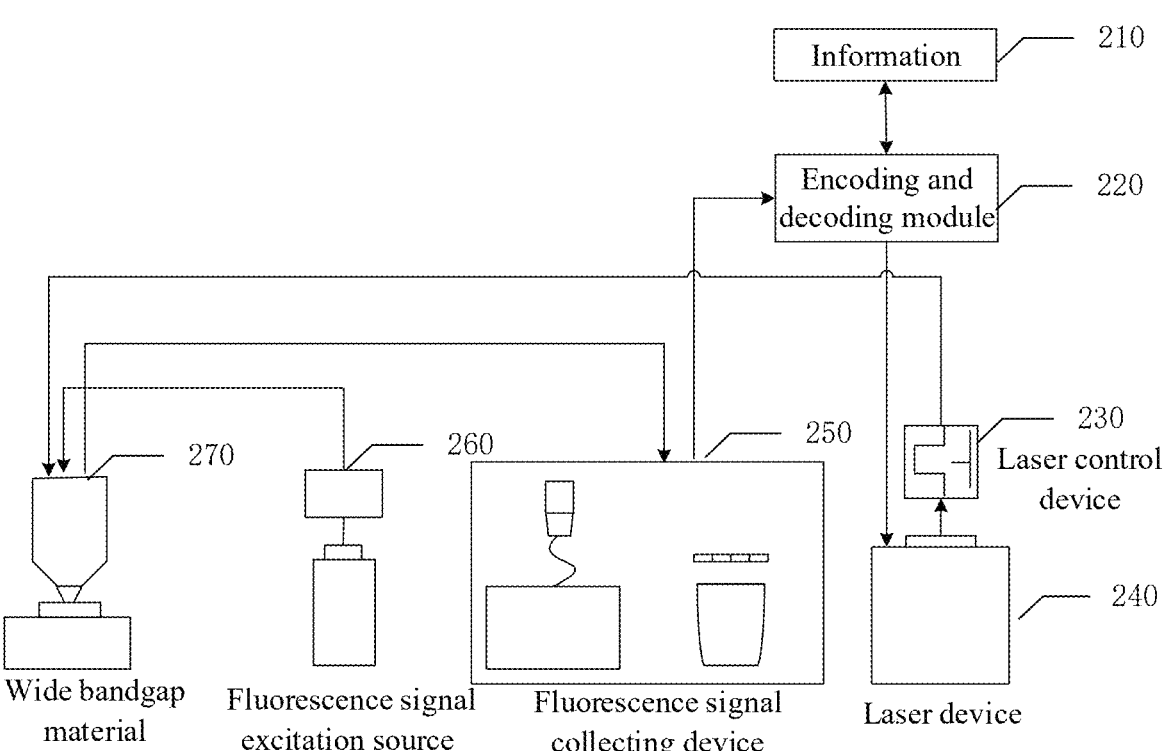

Information — 210

Encoding and decoding module — 220

270

Wide bandgap material

Fluorescence signal excitation source

260

250

Fluorescence signal collecting device

230
Laser control device

240

Laser device

METHOD FOR STORING AND ACQUIRING INFORMATION USING FLUORESCENCE DEFECTS IN WIDE BANDGAP MATERIALS

CROSS-REFERENCE TO RELATED APPLICATION(S)

This application is a Section 371 National Stage Application of International Application No. PCT/CN2023/121071, filed on Sep. 25, 2023, entitled "METHOD FOR STORING AND ACQUIRING INFORMATION USING FLUORESCENCE DEFECT IN WIDE BANDGAP MATE-RIAL", the content of which is incorporated herein by reference in its entirety.

TECHNICAL FIELD

The present disclosure relates to a field of optical information storage technology, and in particular, to a method for storing and acquiring information using fluorescence defects in wide bandgap materials, a device, an apparatus and a storage medium.

BACKGROUND

With the rapid development of science and technology, the amount of computer data is increasing. In the related art, the computer data may be stored in a variety of information storage methods, such as magnetic storage, electrical storage and optical storage. However, the magnetic storage and electrical storage have high requirements for the storage environment and are prone to data loss due to demagneti-zation, leakage and other reasons; and the optical storage has a small storage capacity and may not store a large amount of computer data.

SUMMARY

In view of the above problems, the present disclosure provides a method for storing information using fluores-cence defects in wide bandgap materials, a device, an apparatus and a medium.

According to a first aspect of the present disclosure, a method for storing information using fluorescence defects in wide bandgap materials is provided, including: determining a processing parameter group, wherein the processing parameter group is configured to store target information into wide bandgap materials, and the processing parameter group comprises at least one processing parameter; and performing a processing at M storage addresses of the wide bandgap materials based on the processing parameter group, so that fluorescence defects matching the target information are generated at the M storage addresses, where M is a positive integer.

According to the embodiments of the present disclosure, the method for storing information using fluorescence defects in wide bandgap materials further includes:

determining a number of storage units for storing the target information according to a number of encoding bits of the target information; and determining the storage addresses of M storage units from unprocessed storage units in the wide bandgap mate-rials, so as to obtain the M storage addresses.

According to the embodiments of the present disclosure, the determining a processing parameter group includes:

splitting the target information into M target sub-infor-mation according to a preset encoding length; and determining Q processing parameters corresponding to each target sub-information based on a preset mapping relationship to obtain the processing parameter group, where Q is a positive integer greater than or equal to 1;

wherein the Q processing parameters are configured together to process one of the storage addresses in the wide bandgap materials, and each of the storage addresses is configured to store one of the target sub-information.

According to the embodiments of the present disclosure, the processing parameter includes at least one of: an energy, a length, a number, an intensity and a polarization of a light pulse, and an interval between light pulses.

According to the embodiments of the present disclosure, a type of the fluorescence defects comprises: single-vacancy fluorescence defects, double-vacancy fluorescence defects, doped atom fluorescence defects, or composite fluorescence defects consisting of doped atoms and vacancies; and the wide bandgap materials include at least one of: a diamond, a silicon carbide, a gallium nitride, an aluminum nitride, a zinc oxide, and a lithium niobate.

According to the embodiments of the present disclosure, before performing a processing at M storage addresses of the wide bandgap materials based on the processing parameter group, the method further includes: performing a wavefront correcting on a laser used to process the wide bandgap materials, so that a focus of the laser is located at the M storage addresses.

According to the embodiments of the present disclosure, a method for reading information using fluorescence defects in wide bandgap materials is provided, including:

collecting fluorescence information at M storage addresses in wide bandgap materials, wherein the fluo-rescence information is configured to characterize a distribution of fluorescence defects at each storage address, the fluorescence defects are matched with target information, and the fluorescence defects are generated after processing at the M storage addresses of the wide bandgap materials based on a processing parameter group, where M is a positive integer; and decoding the fluorescence information to obtain the target information.

According to the embodiments of the present disclosure, the fluorescence information includes an intensity spatial distribution, a wavelength spatial distribution and a polar-ization spatial distribution of a fluorescence signal.

A second aspect of the present disclosure provides a method for reading information using fluorescence defects in wide bandgap materials is provided, including:

collecting fluorescence information at M storage addresses in wide bandgap materials, wherein the fluo-rescence information is configured to characterize a distribution of fluorescence defects at each storage address, the fluorescence defects are matched with target information, and the fluorescence defects are generated after processing at the M storage addresses of the wide bandgap materials based on a processing parameter group, where M is a positive integer; and decoding the fluorescence information to obtain the target information.

A third aspect of the present disclosure provides a pro-cessing device for storing information a laser device configured to generate a laser for processing wide bandgap materials; and a laser control device configured to control a processing parameter of the laser according to a processing param-eter group, and use the laser after controlling the processing parameter to process at M storage addresses of the wide bandgap materials, so that fluorescence defects matching target information are generated at the M storage addresses, the processing parameter group is configured to store the target information into the wide bandgap materials, and the processing parameter group comprises at least one processing parameter, where M is a positive integer.

A fourth aspect of the present disclosure provides a reading device for storing information using fluorescence defects in wide bandgap materials, including:

a fluorescence signal excitation source configured to excite fluorescence defects at M storage addresses in wide bandgap materials, so that fluorescence information is generated at the fluorescence defects at the M storage addresses, the fluorescence information is configured to characterize a distribution of the fluorescence defects, the fluorescence defects are matched with target information, and the fluorescence defects are generated after processing at the M storage addresses based on a processing parameter group; and a fluorescence signal collecting device configured to collect the fluorescence information, so as to decode the fluorescence information and obtain the target information.

According to the embodiments of the present disclosure, after processing the wide bandgap materials at any storage address, the structure of the wide bandgap materials at the storage address changes, a variety of fluorescence defects are generated, and the distribution of the fluorescence defects may carry information, so the target information may be stored in the wide bandgap materials using the fluorescence defects. In addition, the wide bandgap materials have good high temperature tolerance and strong electric field tolerance, and nay achieve long-term storage of target information.

Therefore, in the embodiments of the present disclosure, by determining the processing parameter group and processing the wide bandgap materials at M storage addresses based on the processing parameter group, the fluorescence defects matching the target information are generated at the M storage addresses, which may achieve information storage with high storage density, long storage life and low energy consumption.

BRIEF DESCRIPTION OF THE DRAWINGS

The above contents and other purposes, features and advantages of the present disclosure will become clearer through the following description of the embodiments of the present disclosure with reference to the drawings, in which:

FIG. 1 schematically shows a flow chart of a method for storing information using fluorescence defects in wide bandgap materials according to the embodiments of the present disclosure;

FIG. 2 schematically shows a schematic diagram of a system for storing and reading information using fluorescence defects in wide bandgap materials according to the embodiments of the present disclosure;

DETAILED DESCRIPTION OF EMBODIMENTS

Figure 3:
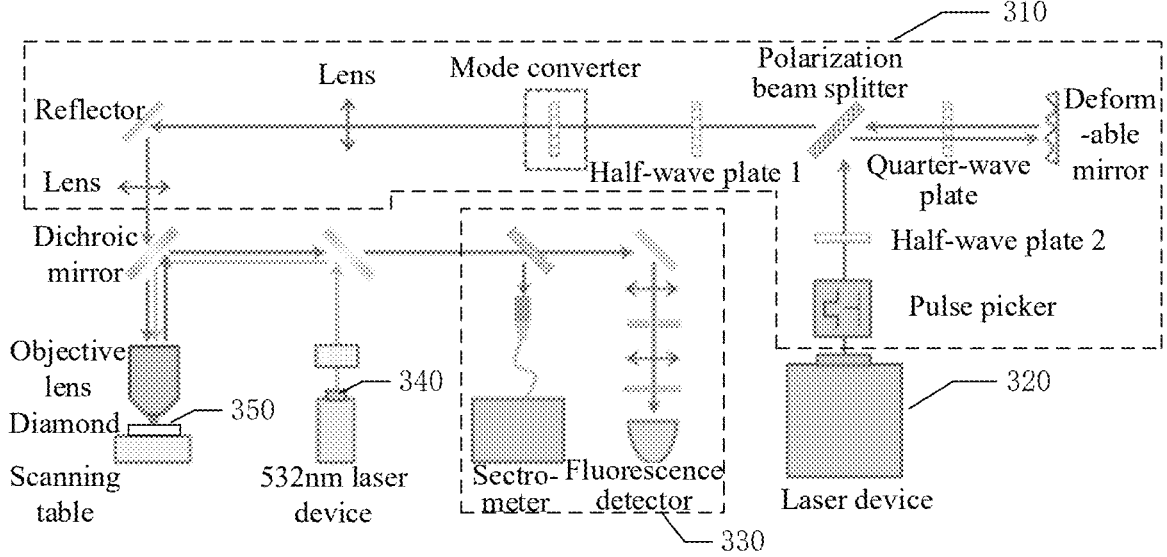
FIG. 3 schematically shows a schematic diagram of a device for storing and reading information using fluorescence defects in wide bandgap materials according to a specific embodiment of the present disclosure.

Hereinafter, the embodiments of the present disclosure will be described with reference to the drawings. However, it should be understood that these descriptions are exemplary only and are not intended to limit the scope of the present disclosure. In the following detailed description, for ease of explanation, many specific details are set forth to provide a comprehensive understanding of the embodiments of the present disclosure. However, it is obvious that one or more embodiments may also be implemented without these specific details. In addition, in the following description, descriptions of well-known structures and technologies are omitted to avoid unnecessary confusion of the concepts of the present disclosure.

The terms used herein are only for the purpose of describing specific embodiments and are not intended to limit the present disclosure. The terms "including", "comprising", etc. used herein indicate the presence of the features, steps, operations and/or components, but do not exclude the presence or addition of one or more other features, steps, operations or components.

All terms (including technical and scientific terms) used herein have the meanings commonly understood by those skilled in the art, unless otherwise defined. It should be noted that the terms used herein should be interpreted as having a meaning consistent with the context of this specification and should not be interpreted in an idealized or overly rigid manner.

In the case of using expressions such as "at least one of A, B, and C, etc.", it should generally be interpreted in accordance with the meaning commonly understood by those skilled in the art (for example, "a system having at least one of A, B, and C" should include but is not limited to a system having A alone, B alone, C alone, A and B, A and C, B and C, and/or A, B, C, etc.).

In the technical solution of the present disclosure, the user information (including but not limited to user personal information, user image information, user device information, such as location information, etc.) and data (including but not limited to data used for analysis, stored data, displayed data, etc.) involved are all information and data authorized by the user or fully authorized by all parties, and the collection, storage, use, processing, transmission, provision, disclosure and application of the relevant data comply with the relevant laws, regulations and standards of the relevant countries and regions, take necessary confidentiality measures, do not violate public order and good morals, and provide corresponding operation entrances for users to choose to authorize or refuse.

To this end, the embodiments of the present disclosure provides a method for storing information using fluorescence defects in wide bandgap materials, including: determining a processing parameter group, wherein the processing parameter group is configured to store target information into wide bandgap materials, and the processing parameter group comprises at least one processing parameter; and performing a processing at M storage addresses of the wide bandgap materials based on the processing parameter group, so that fluorescence defects matching the target information are generated at the M storage addresses, where M is a positive integer.

FIG. 1 schematically shows a flow chart of a method for storing information using fluorescence defects in wide bandgap materials according to the embodiments of the present disclosure.

As shown in FIG. 1, the method 100 includes operations S110 to S120.

In operation S110, a processing parameter group is determined, wherein the processing parameter group is used to store target information into wide bandgap materials, and the processing parameter group includes at least one processing parameter.

According to the embodiments of the present disclosure, the target information includes information in various forms, such as text information, image information, symbol information, etc. In the embodiments of the present disclosure, the above target information may also be encoded into a binary form by a computer.

According to the embodiments of the present disclosure, the processing parameter include a control parameter of an apparatus for processing wide bandgap materials or parameters of an output laser, etc.

For example, the processing parameter is a control parameter of a femtosecond laser processing system, such as the energy of a light pulse, the number of light pulses, etc.

According to the embodiments of the present disclosure, the processing parameter group includes at least one processing parameter belonging to different processing parameter types. Different processing parameters may include the same processing parameter type and/or the same number of processing parameters, etc., but the parameter values of the processing parameters of different processing parameter groups are different.

For example, for target information 1, the processing parameter group may include 1 energy parameter; for target information 2, the processing parameter group may include 1 energy parameter and 1 polarization parameter.

In operation S120, a processing is performed at M storage addresses of the wide bandgap materials based on the processing parameter group, so that fluorescence defects matching the target information are generated at the M storage addresses, where M is a positive integer.

According to the embodiments of the present disclosure, since the bandgap of wide bandgap materials is wide, many energy level defects may exist in the bandgap. Some defects will emit fluorescence after being excited by a specific light field, so the defects are called fluorescence defects.

According to the embodiments of the present disclosure, a plurality of target information corresponds to a plurality of fluorescence defects. When the wide bandgap materials are processed using different processing parameter groups, a plurality of types of fluorescence defects may be generated, thereby storing diverse target information.

For example, fluorescence defects with a plurality of defect types may store a plurality of target information; for one defect type, fluorescence defects with a plurality of density distributions may store a plurality of target information.

According to the embodiments of the present disclosure, after processing the wide bandgap materials at any storage address, the structure of the wide bandgap materials at the storage address changes, a variety of fluorescence defects are generated, and the distribution of the fluorescence defects may carry information, so the target information may be stored in the wide bandgap materials using the fluorescence defects. In addition, the wide bandgap materials have good high temperature tolerance and strong electric field tolerance, and may achieve long-term storage of target information.

Therefore, in the embodiments of the present disclosure, by determining the processing parameter group and processing the wide bandgap materials at M storage addresses based on the processing parameter group, the fluorescence defects matching the target information are generated at the M storage addresses, which may achieve information storage with high storage density, long storage life and low energy consumption.

According to the embodiments of the present disclosure, the method for storing information using fluorescence defects in wide bandgap materials further includes: determining a number of storage units for storing the target information according to a number of encoding bits of the target information; and determining the storage addresses of M storage units from unprocessed storage units in the wide bandgap materials, so as to obtain the M storage addresses.

According to the embodiments of the present disclosure, the number of encoding bits is the length of the encoding information after the target information is encoded using a preset encoding method. For example, after the target information is encoded as binary information "110101110", the number of encoding bits is 9.

According to the embodiments of the present disclosure, each storage address corresponds to a storage unit, and the storage unit may be understood as a virtual storage location for storing computer data. After the storage address of a single storage unit is processed, the single storage unit may include one or more types of fluorescence defects.

According to the embodiments of the present disclosure, the length of the target information that may be stored in each storage unit is limited. Therefore, according to the number of encoding bits of the target information to be stored, the number of storage units used to store the target information may be determined.

For example, still taking the target information as "110101110" as an example, if each storage unit may store information of 3 lengths, the target information requires 3 storage units.

According to the embodiments of the present disclosure, after determining the number of storage units used to store the target information, M storage units may be randomly determined from the unprocessed storage units in the wide bandgap materials, and the storage addresses of the M storage units are used as the storage addresses to be processed.

As another embodiment of the present disclosure, the wide bandgap materials may be divided into regions according to the processing parameter types. After determining the number of storage units for storing target information, the target processing region may be determined according to the processing parameter type in the processing parameter group; M storage units are selected from the unprocessed storage units in the target processing region to obtain the storage addresses of the M storage units.

According to the embodiments of the present disclosure, the determining a processing parameter group includes: splitting the target information into M target sub-information according to a preset encoding length; and determining Q processing parameters corresponding to each target sub-information based on a preset mapping relationship to obtain the processing parameter group, where Q is a positive integer greater than or equal to 1; where the Q processing parameters are configured together to process one of the storage addresses in the wide bandgap materials, and each of the storage addresses is configured to store one of the target sub-information.

According to the embodiments of the present disclosure, the preset encoding length is the length of information that may be stored in a storage unit, such as 3. After determining the target information, the target information may be split into M target sub-information in sequence with the preset encoding length as the minimum granularity unit.

According to the embodiments of the present disclosure, the lateral length of each storage unit is about 500 nm and the longitudinal length is about 2 um to ensure that two storage units are spatially distinguished.

According to another embodiment of the present disclosure, the fluorescence signal of the fluorescence defects at the storage unit may be read by a super-resolution scheme. At this time, the distance between the storage units may exceed the optical diffraction limit, that is, the lateral length of the storage unit is less than 500 nm and the longitudinal length is less than 2 um. According to the embodiment of the present disclosure, the target sub-information may be regarded as standard encoding information, and a mapping relationship between the standard encoding information and the processing parameter is pre-established based on the length of information that may be stored in the storage unit, that is, a preset mapping relationship. For example, the processing parameter corresponding to "000" is energy "5 nJ".

According to the embodiments of the present disclosure, after the target information is split into M target sub-information, at least one processing parameter corresponding to each target sub-information may be determined based on the pre-established preset mapping relationship, and then the plurality of processing parameters constituting the processing parameter group may be determined.

According to the embodiments of the present disclosure, the same target sub-information as standard encoding information may correspond to a plurality of processing parameter groups. For example, there is a preset mapping relationship between target sub-information "000" and energy "5 nJ", and there may also be a preset mapping relationship between the target sub-information "000" and energy+polarization of the light pulse.

It should be noted that after the wide bandgap materials are processed based on the processing parameter group, the fluorescence signal of the fluorescence defects uniquely corresponds to one target sub-information.

According to the embodiments of the present disclosure, the processing parameter includes at least one of: an energy, a length, a number, an intensity and a polarization of a light pulse, and an interval between light pulses.

According to the embodiment of the present disclosure, the encoding dimension of the information to be stored may be increased by adjusting the number of light pulses for writing information. For example, each storage unit is only used to write a single light pulse, so that the volume of the information storage unit is minimized and the information storage density of the wide bandgap materials is the highest. Alternatively, information A is written in storage unit A by a single light pulse, and information B is written in storage unit B by two or more light pulses.

According to the embodiments of the present disclosure, the type of fluorescence defects includes at least one of the following: single-vacancy fluorescence defect, double-vacancy fluorescence defect and vacancy doped atomic fluorescence defect.

According to the embodiments of the present disclosure, the wide bandgap materials include at least one of the following: diamond, silicon carbide, gallium nitride, aluminum nitride, zinc oxide and lithium niobate.

According to the embodiments of the present disclosure, the wide bandgap material itself has stable performance, has low requirements for the storage environment, and allows the existence of many defect energy levels in the bandgap.

Therefore, the method of optical information storage based on fluorescence defects in wide bandgap material provided by the present disclosure may meet the information storage requirements of high storage density, long storage life and low energy consumption.

For example, for target information 101001010100, 4 target sub-information 101, 001, 010 and 100 may be obtained, which may be stored at storage addresses 0, 1, 2, and 3 of unprocessed storage units, and the storage addresses are used to store the target sub-information 101, 001, 010, and 100 respectively.

Still taking the energy of the light pulse as the processing parameter as an example, according to the preset mapping relationship, the write energy corresponding to each storage address may be determined to be 10 nJ, 6 nJ, 7 nJ, and 9 nJ. That is, the determined processing parameter group is 10 nJ, 6 nJ, 7 nJ, and 9 nJ, and the processing scheme is: write the fluorescence defects with 10 nJ energy at position 0, write the fluorescence defects with 6 nJ energy at position 1, write the fluorescence defects with 7 nJ energy at position 2, and write the fluorescence defects with 9 nJ energy at position 3.

According to the embodiments of the present disclosure, before processing at M storage addresses of the wide bandgap materials based on the processing parameter group, the method further includes: performing a wavefront correcting on a laser used to process the wide bandgap materials, so that a focus of the laser is located at the M storage addresses.

According to the embodiments of the present disclosure, parameters of the laser used to process the wide bandgap materials are partially the same as parameters in the processing parameter group. For example, the energy is the same.

According to the embodiments of the present disclosure, if the refractive index of the wide bandgap materials is different from that of the working medium of the objective lens in the device for collecting the fluorescence signal, after the laser is converged by the objective lens and reaches the interface of the wide bandgap materials through the objective lens working medium, the wavefront of the laser will be distorted, thereby causing the laser focus to diffuse inside the wide bandgap materials, resulting in a decrease in processing accuracy.

Therefore, before processing the wide bandgap materials according to the processing parameter group, the wavefront of the processed laser may also be corrected, so that when the laser is converged by the objective lens and reaches the interface of the wide bandgap materials through the objective lens working medium, the focus of the laser falls at each processing storage address, thereby providing optimal processing accuracy.

According to the embodiments of the present disclosure, there is a method for reading information using fluorescence defects in wide bandgap materials, including: collecting fluorescence information at M storage addresses in wide bandgap materials, wherein the fluorescence information is configured to characterize a distribution of fluorescence defects at each storage address, the fluorescence defects are matched with target information, and the fluorescence defects are generated after processing at the M storage addresses of the wide bandgap materials based on a processing parameter group, where M is a positive integer; and decoding the fluorescence information to obtain the target information.

According to the embodiments of the present disclosure, the relationship between the fluorescence signal characterizing the distribution of fluorescence defects and the stored information may be established in advance. Thus, by decoding the collected fluorescence signal, the target information may be obtained.

According to the embodiment of the present disclosure, the fluorescence information includes an intensity spatial distribution, a wavelength spatial distribution and a polarization spatial distribution of the fluorescence signal.

For example, the intensity of the fluorescence signal at storage address 1 is 4, and the target sub-information "001" stored at storage address 1 is obtained by decoding.

According to the embodiment of the present disclosure, due to the storage error of the processing process, the target information may be determined according to the parameter interval where the fluorescence signal is located.

For example, when the fluorescence signal includes fluorescence intensity, the pre-divided parameter interval may be 1-2 MHz/s, 2-3 MHz/s, 3-4 MHz/s, 4-5 MHz/s, 5-6 MHz/s, 6-7 MHz/s, 7-8 MHz/s, 8-9 MHz/s. The encoding information corresponding to the above parameter intervals is 001, 010, 100, 101, 110, 011, 011, 111.

Therefore, when the fluorescence intensity of the fluorescence defects at storage address 1 is decoded to be 1.5 MHz/s, the target sub-information at storage address 1 is 001. For the stored target information "101001010100", the fluorescence signals at M storage addresses may be decoded respectively to obtain the target information "101001010100".

According to the embodiments of the present disclosure, by reading the fluorescence information of different storage addresses, the distribution of fluorescence defects at each storage address is obtained, and decoding is performed based on the fluorescence signal, so that the target information may be obtained, the target information may be read, and information storage with high storage density, long storage life and low energy consumption may be realized.

According to the embodiments of the present disclosure, the fluorescence information includes the intensity spatial distribution, wavelength spatial distribution and polarization spatial distribution of the fluorescence signal.

According to the embodiments of the present disclosure, there is a processing device for storing information using fluorescence defects in wide bandgap materials, including: a laser device configured to generate a laser for processing wide bandgap materials; a laser control device configured to control a processing parameter of the laser according to a processing parameter group, and use the laser after controlling the processing parameter to process at M storage addresses of the wide bandgap materials, so that fluorescence defects matching target information are generated at the M storage addresses, the processing parameter group is configured to store the target information into the wide bandgap materials, and the processing parameter group comprises at least one processing parameter, where M is a positive integer.

According to the embodiments of the present disclosure, the laser device is used to emit laser, for example, which may be a femtosecond laser. The laser control device is used to adjust the light pulse energy, light pulse length, light pulse number, interval between light pulses, intensity distribution of light pulses and polarization of light pulses of the laser light emitted by the laser device.

According to the embodiments of the present disclosure, the laser control device may be a femtosecond laser control module.

As a specific embodiment of the present disclosure, the laser control device may be obtained by combining a pulse picker, a half-wave plate, a polarizer, and a deformable reflector.

According to the embodiments of the present disclosure, a laser mode converter or a spatial light modulation system may be selectively added to the laser control device to generate a plurality of focal points to achieve parallel writing of target information and improve the information writing speed. Alternatively, the laser control device may also be obtained by combining an optical shutter, a mode converter, a spatial light modulator, and a diffractive optical element.

According to the embodiments of the present disclosure, the processing device for storing information using fluorescence defects in wide bandgap materials may further include a sample position controlling module for controlling the processing point position of the laser emitted by the laser device.

As a specific embodiment, the sample position controlling module may include a three-dimensional displacement device and a movable reflector. Alternatively, the sample position controlling module may also be a movable optical module for adjusting the laser focus position.

According to the embodiments of the present disclosure, there is a reading device for storing information using fluorescence defects in wide bandgap materials, including: a fluorescence signal excitation source configured to excite fluorescence defects at M storage addresses in wide bandgap materials, so that fluorescence information is generated at the fluorescence defects at the M storage addresses, the fluorescence information is configured to characterize a distribution of the fluorescence defects, the fluorescence defects are matched with target information, and the fluorescence defects are generated after processing at the M storage addresses based on a processing parameter group; and a fluorescence signal collecting device configured to collect the fluorescence information, so as to decode the fluorescence information and obtain the target information.

According to the embodiments of the present disclosure, the fluorescence signal excitation source is used to excite fluorescence defects in a processed wide bandgap material to an excited state, so that the fluorescence defects emit fluorescence signal. The fluorescence signal excitation source may be a continuous wave laser device and a pulsed laser device and may also be an electronic excitation source, such as an electrode that may generate carrier transfer in the material, or may be a combination of the above excitation sources.

For example, the fluorescence signal excitation source may be a continuous laser with a wavelength of 532 nanometers, so that the fluorescence defects in the processed wide bandgap material are excited to an excited state. For example, the laser emitted by the fluorescence signal excitation source is a femtosecond laser.

The fluorescence signal collecting device is used to collect fluorescence information in the wide bandgap materials, and the fluorescence signal collecting device may be an imaging system with three-dimensional spatial resolution capability, such as a confocal laser scanning system, a wide-field imaging system, a wide-field multi-layer imaging system, and a super-resolution imaging system.

The fidelity of the read information may be ensured by the confocal laser scanning system. The data may be read out in parallel by the wide-field imaging system and the wide-field multi-layer imaging system, thereby improving the readout speed. The super-resolution imaging system may obtain a higher-resolution fluorescence distribution, so that the encoding space of a single information storage unit is larger, and higher-density information storage may be achieved.

According to the embodiments of the present disclosure, the fluorescence signal collecting device also has a spatial filtering capability, which is used to collect fluorescence signals near the laser focus and filter out other fluorescence signals that are far away from the laser focus. For example, the fluorescence signal collecting device may be equipped with a spatial filtering device to achieve spatial filtering capability.

In order to make the purpose, technical solution and advantages of the present invention more clearly understood, the present disclosure is further described in detail below in combination with specific embodiments and with reference to the drawings.

According to the embodiments of the present disclosure, the processing device and the reading device for storing information using fluorescence defects in wide bandgap materials may be integrated together, such as a system for storing and reading information using fluorescence defects in wide bandgap materials.

According to the embodiments of the present disclosure, for a system for storing and reading information using fluorescence defects in wide bandgap materials, an embodiment of wavefront correcting includes: In a processing device for storing information using fluorescence defects in wide bandgap materials, the laser device is a femtosecond laser device for emitting femtosecond laser. The laser control device includes a wavefront compensating device for performing a wavefront compensation on the femtosecond laser after adjusting parameters, so that the focus of the femtosecond laser falls on the adjustment position of the wide bandgap materials. The adjustment position may be a preset position in the wide bandgap materials for wavefront correcting.

The reading device for storing information using fluorescence defects in wide bandgap materials is used to excite and collect the fluorescence signal of the fluorescence defects at the adjustment position. The fluorescence signal collecting device in the reading device is equipped with a spatial filtering device.

In the embodiments of the present disclosure, the femtosecond laser may excite a wide-spectrum fluorescence signal in a wide-bandgap semiconductor at low power, and the distribution of the fluorescence signals depends on the distribution of the focus of the femtosecond laser. When the femtosecond laser is diffused, part of the fluorescence signal is not near the laser focus, and this part of the fluorescence signal may not pass through the spatial filtering device in the fluorescence signal collecting device. Therefore, the focus of the femtosecond laser may be automatically and quickly optimized by using the spatial filtering device, so that the wavefront correcting process is automatic and rapid. Since the power required for femtosecond to excite a wide-spectrum fluorescence signal is low and there is no damage to the wide-bandgap material, the wavefront correcting process is also lossless.

FIG. 2 schematically shows a schematic diagram of a system for storing and reading information using fluorescence defects in wide bandgap materials according to the embodiments of the present disclosure.

As shown in FIG. 2, a system for storing and reading information using fluorescence defects in wide bandgap materials in this embodiment includes: information 210, an encoding and decoding module 220, a fluorescence signal collecting device 230, a laser device 240, a laser control device 250, a fluorescence signal excitation source 260 and a wide bandgap material 270.

According to the embodiments of the present disclosure, the information 210 may be target information to be stored, such as text information, symbol information, etc. The encoding and decoding module 220 is used to encode the target information and determine a processing parameter group for storing the target information, and convert the collected fluorescence signal into a target signal. In the information storage stage, the laser device 240 is used to emit laser, for example, it may be a femtosecond laser device. The laser control device 250 is used to adjust the light pulse energy, light pulse length, light pulse number, interval between light pulses, light pulse intensity distribution and light pulse polarization of the laser emitted by the laser device 240, so as to store the information 210 into the wide bandgap materials.

In the information collection stage, the fluorescence signal excitation source 260 excites the fluorescence defects in the processed wide bandgap material to an excited state, so that the fluorescence defects emit a fluorescence signal. The fluorescence signal collecting device 230 collects the fluorescence signal in the wide bandgap materials, and then the collected fluorescence signal is decoded by the encoding and decoding module 220 to obtain information 210.

According to the embodiments of the present disclosure, the encoding and decoding module 220 may be a computer, a field programmable gate array (FPGA), a programmable logic array (PLA), a system on a chip, a system on a substrate, a system on a package, an application specific integrated circuit (AIC), hardware or firmware obtained by integrating or packaging circuits in any other reasonable manner, or at least one of the three implementation methods of software, hardware, and firmware.

FIG. 3 schematically shows a schematic diagram of a device for storing and reading information using fluorescence defects in wide bandgap materials according to a specific embodiment of the present disclosure.

As shown in FIG. 3, a schematic diagram of a device for storing and reading information using fluorescence defects in wide bandgap materials according to a specific embodiment of the present disclosure includes: a laser control device 310, a laser device 320, a fluorescence signal collecting device 330, a 532 nm laser device 340, and a diamond 350.

According to the embodiment of the present disclosure, the laser control device 310 is integrated inside the laser device 320, and the laser control device 310 controls the laser device 320 through control parameters transmitted by a computer, and finally a light pulse is output. For example, a femtosecond laser device includes the laser device 320 as a light source and the laser control device 310.

According to the embodiment of the present disclosure, a wavefront compensation device may be provided in the laser control device 310 to offset the wavefront distortion caused by different working media. According to actual needs, any single or combined optical device that may be used for wavefront compensation is acceptable.

According to the embodiment of the present disclosure, the laser control device 310 includes a reflector, two lenses located on two sides of the reflector, a mode converter, a half-wave plate 1, a half-wave plate 2, a polarization beam splitter, a quarter-wave plate, a deformable mirror, and a pulse picker.

The pulse picker is used as an optical switch to process the continuous laser into optical pulses through the control information sent by the computer. For example, the pulse picker may emit a light pulse at the storage address to be processed under one control.

As another embodiment of the present disclosure, in the non-processing stage, the pulse picker may not allow light to pass; in the processing stage, after the focus of the laser moves to the storage address to be processed, the laser is controlled to pass through the pulse picker through the control information.

The half-wave plate 2 located after the pulse picker is used to adjust the polarization direction of the light.

The polarization beam splitter receives the light pulse emitted from the half-wave plate 2 and reflects the light in the S polarization direction or the P polarization direction of the light pulse to the quarter-wave plate. The polarization beam splitter and the half-wave plate 2 are combined to adjust the intensity of the light pulse.

The quarter-wave plate transmits the light pulse received from the polarization beam splitter to the deformable mirror, and transmits the light pulse returned from the deformable mirror to the polarization beam splitter again. At this time, the polarization beam splitter transmits the light pulse transmitted by the quarter-wave plate to the half-wave plate 1.

The deformable mirror acts as a wavefront compensation device, which improves the processing accuracy by pre-compensating the distortion of the wavefront to avoid the dispersion of the laser focus inside the diamond.

The half-wave plate 1 is also used to adjust the polarization of the light pulse, and transmit the adjusted light pulse to the mode converter, so that a plurality of focal points are generated to achieve parallel writing.

As another embodiment of the present disclosure, a spatial light modulator may be used to replace the half-wave plate 1 to achieve more complex polarization adjustment.

The lens arranged between the mode converter and the reflector is used to converge the light pulse output from the mode converter and transmit the light pulse to the reflector. The reflector is used to change the propagation direction of the light pulse in the optical path. The lens arranged after the reflector is used to converge the light pulse output from the reflector again.

According to the embodiment of the present disclosure, two lenses located before and after the reflector constitute a 4f optical system, which enables the wavefront pre-compensated by the deformable mirror to be accurately transmitted to the back focal plane of the objective lens, thereby improving the processing accuracy.

In the embodiment of the present disclosure, the fluorescence signal collecting device 330 may include a spectrometer and a fluorescence detector. The spectrometer is used to detect the wavelength spatial distribution of the fluorescence signal, and the fluorescence detector is used to detect the intensity spatial distribution of the fluorescence signal.

According to an embodiment of the present disclosure, the fluorescence signal collecting device 330 may also include a polarized light microscope system for detecting the polarization spatial distribution of the fluorescence signal.

In the embodiment of the present disclosure, the 532 nm laser device 340 is used to excite the fluorescence defects in the processed diamond, so that the fluorescence defects generate a fluorescence signal.

According to the embodiment of the present disclosure, the diamond 350 is used as a wide bandgap material for storing target information. The diamond 350 may be placed on a scanning table so that the diamond 350 may be processed by the objective lens of the scanning table.

According to the embodiment of the present disclosure, the light pulse output by the laser control device 310 may be transmitted to the objective lens of the scanning table through a dichroic mirror to achieve the processing of diamond 350.

According to the embodiment of the present disclosure, during the information storage process, the scanning table may be controlled to achieve focus movement. For example, the focus is moved to a 0 point position in the diamond, the half-wave plate 1 in the laser control device 310 is rotated so that the laser 320 emits a laser energy of 10 nJ, and a trigger signal is sent to the pulse picker in the laser control device 310. The pulse picker drives a pulse into the diamond, and the information is stored at other points through similar operations.

Figure 4:
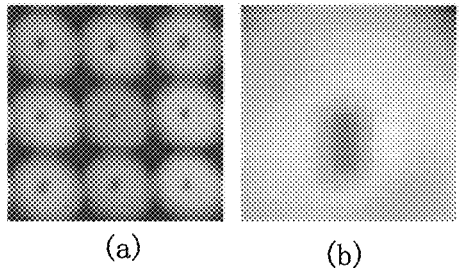
FIG. 4 schematically shows a schematic diagram of a fluorescence signal according to a specific embodiment of the present disclosure.

FIG. 4 schematically shows a schematic diagram of a fluorescence signal according to a specific embodiment of the present disclosure.

FIG. 4 includes FIG. 4(*a*) and FIG. 4(*b*), FIG. 4(*a*) is a fluorescence signal scanning result of a storage unit array formed by a group of storage units, and FIG. 4(*b*) is an enlarged view of a storage unit intercepted from FIG. 4(*a*).

As a specific embodiment of the present disclosure, the scanning result of FIG. 4(*a*) may be measured by a ground state depletion super-resolution optical fluorescence microscope. The ground state depletion super-resolution optical fluorescence microscope may collect fluorescence signals located near the focal position of the femtosecond laser.

The central area of FIG. 4(*b*) corresponds to the storage morphology of a single storage unit, and the orientation of the polarized light used for writing is in the vertical direction.

According to the embodiment of the present disclosure, since the storage unit may also be set to have a specific spatial orientation, the orientation angle of the storage unit may also be used as a new encoding dimension to achieve information encoding.

According to the embodiments of the present disclosure, the program code of the computer program for executing the encoding and decoding module provided by the embodiments of the present disclosure may be written in any combination of one or more programming languages. Specifically, these computing programs may be implemented using high-level process and/or object-oriented programming languages, and/or assembly/machine languages. Programming languages include, but are not limited to, Java, C++, python, "C" language or similar programming languages. The program code may be executed entirely on the user computing device, partially on the user device, partially on the remote computing device, or entirely on the remote computing device or server. In the case of a remote computing device, the remote computing device may be connected to the user computing device through any type of network, including a local area network (LAN) or a wide area network (WAN), or may be connected to an external computing device (for example, using an Internet service provider to connect through the Internet).

The flow chart in the accompanying drawings illustrates the possible architecture, function and operation of the system, method and computer program product according to various embodiments of the present disclosure. In this regard, each box in the flow chart or block diagram may represent a module, a program segment or a part of a code, and the above-mentioned module, program segment or a part of the code contains one or more executable instructions for realizing the specified logical function. It should also be noted that in some alternative implementations, the functions marked in the box may also occur in a different order from the order marked in the accompanying drawings. For example, two boxes represented in succession may actually be executed substantially in parallel, and they may sometimes be executed in the opposite order, depending on the functions involved. It should also be noted that each box in the block diagram or flow chart, and the combination of the boxes in the block diagram or flow chart may be implemented with a dedicated hardware-based system that performs the specified function or operation, or may be implemented with a combination of dedicated hardware and computer instructions.

Those skilled in the art will appreciate that the features described in the various embodiments and/or claims of the present disclosure may be combined and/or combined in various ways, even if such combinations and/or combinations are not explicitly described in the present disclosure. In particular, without departing from the spirit and teachings of the present disclosure, the features described in the various embodiments and/or claims of the present disclosure may be combined and/or combined in various ways. All of these combinations and/or combinations fall within the scope of the present disclosure.

The specific embodiments described above further describe the purpose, technical solutions and beneficial effects of the present disclosure in detail. It should be understood that the above description is only a specific embodiment of the present disclosure and is not intended to limit the present disclosure. Any modifications, equivalent substitutions, improvements, etc. made within the spirit and principles of the present disclosure shall be included in the scope of protection of the present disclosure.

What is claimed is:

1. A method for storing information using fluorescence defects in wide bandgap materials, comprising:
    determining a processing parameter group, wherein the processing parameter group is configured to store target information into wide bandgap materials, and the processing parameter group comprises at least one processing parameter; and
    performing a processing at M storage addresses of the wide bandgap materials based on the processing parameter group, so that fluorescence defects matching the target information are generated at the M storage addresses, where M is a positive integer.

2. The method according to claim 1, further comprising:
    determining a number of storage units for storing the target information according to a number of encoding bits of the target information; and
    determining the storage addresses of M storage units from unprocessed storage units in the wide bandgap materials, so as to obtain the M storage addresses.

3. The method according to claim 1, wherein determining a processing parameter group comprises:
    splitting the target information into M target sub-information according to a preset encoding length; and
    determining Q processing parameters corresponding to each target sub-information based on a preset mapping relationship to obtain the processing parameter group, where Q is a positive integer greater than or equal to 1;
    wherein the Q processing parameters are configured together to process one of the storage addresses in the wide bandgap materials, and each of the storage addresses is configured to store one of the target sub-information.

4. The method of claim 1, wherein the processing parameter comprises at least one of: an energy, a length, a number, an intensity and a polarization of a light pulse, and an interval between light pulses.

5. The method according to claim 1, wherein types of the fluorescence defects comprise: single-vacancy fluorescence defects, double-vacancy fluorescence defects, doped atom fluorescence defects, or composite fluorescence defects consisting of doped atoms and vacancies; and
    the wide bandgap materials comprise at least one of: a diamond, a silicon carbide, a gallium nitride, an aluminum nitride, a zinc oxide, and a lithium niobate.

6. The method according to claim 1, wherein, before performing a processing at M storage addresses of the wide bandgap materials based on the processing parameter group, the method further comprises:
    performing a wavefront correcting on a laser used to process the wide bandgap materials, so that a focus of the laser is located at the M storage addresses.

7. A method for reading information using fluorescence defects in wide bandgap materials, comprising:
    collecting fluorescence information at M storage addresses in wide bandgap materials, wherein the fluorescence information is configured to characterize a distribution of fluorescence defects at each storage address, the fluorescence defects are matched with target information, and the fluorescence defects are generated by using the method of claim 1; and
    decoding the fluorescence information to obtain the target information.

8. The method according to claim 7, wherein the fluorescence information comprises an intensity spatial distribution, a wavelength spatial distribution and a polarization spatial distribution of a fluorescence signal.

9. A processing device for storing information using fluorescence defects in wide bandgap materials, comprising:
    a laser device configured to generate a laser for processing wide bandgap materials; and
    a laser control device configured to control a processing parameter of the laser according to a processing parameter group, and use the laser after controlling the processing parameter to process at M storage addresses of the wide bandgap materials, so that fluorescence defects matching target information are generated at the M storage addresses, the processing parameter group is configured to store the target information into the wide bandgap materials, and the processing parameter group comprises at least one processing parameter, where M is a positive integer.

10. A reading device for storing information using fluorescence defects in wide bandgap materials, comprising:
    a fluorescence signal excitation source configured to excite fluorescence defects at M storage addresses in wide bandgap materials, so that fluorescence information is generated at the fluorescence defects at the M storage addresses, the fluorescence information is configured to characterize a distribution of the fluorescence defects, the fluorescence defects are matched with target information, and the fluorescence defects are generated after processing at the M storage addresses based on a processing parameter group; and
    a fluorescence signal collecting device configured to collect the fluorescence information, so as to decode the fluorescence information and obtain the target information.

11. The method according to claim 2, wherein determining a processing parameter group comprises:

splitting the target information into M target sub-information according to a preset encoding length; and determining Q processing parameters corresponding to each target sub-information based on a preset mapping relationship to obtain the processing parameter group, where Q is a positive integer greater than or equal to 1;

wherein the Q processing parameters are configured together to process one of the storage addresses in the wide bandgap materials, and each of the storage addresses is configured to store one of the target sub-information.

\* \* \* \* \*